Oct. 12, 1965   J. S. KLEIN   3,211,131
SCREW FEED ADJUSTMENT
Filed Feb. 27, 1964   2 Sheets-Sheet 1

JAMES S. KLEIN
INVENTOR

BY
ATTORNEY

United States Patent Office 3,211,131
Patented Oct. 12, 1965

3,211,131
SCREW FEED ADJUSTMENT
James S. Klein, Burlington, Iowa, assignor to Klein Manufacturing Co., Burlington, Iowa, a corporation of Iowa
Filed Feb. 27, 1964, Ser. No. 347,741
3 Claims. (Cl. 119—53)

This invention pertains to animal feeders and more particularly to the adjusting mechanism in animal feeders which controls the flow of feed into the troughs.

The animal feeding industry has had many difficulties to overcome, among which are the adjustment of the flow of feed into the troughs of an automatic feeder. The adjustment must be constant for controlled feeding and must be rigid so that the animals will not be able to change the setting. In the past the adjusting mechanisms have been in the hopper itself which requires working of the mechanism against the feed in the hopper or setting it at one setting and not moving it thereafter. Furthermore the mechanism was exposed to the feed which caused it to fail on occasion or become very difficult to operate.

It is therefore an object of this invention to provide a screw feed adjustment which will have a screw handle near the feeding trough making it possible to make the adjustment and see the actual results of the adjustment while so doing.

It is a further object of this invention to provide a screw feed adjustment which will not be exposed to the feed flowing through the hopper to which it is attached but rather which will be enclosed, thus not having feed make the parts unworkable.

It is a further object of this invention to provide a screw feed adjustment that will give an even adjustment all around the hopper of the feeding trough.

It is a further object of this invention to provide a screw feed adjustment which will hold its adjustment after being set.

It is a further object of this invention to provide a screw feed adjustment which is economical to build and which can be installed at a relatively small expense on existing feed hoppers.

Further objects and advantages of this invention will become apparent from the following drawings, descriptions and claims.

Figure 1:
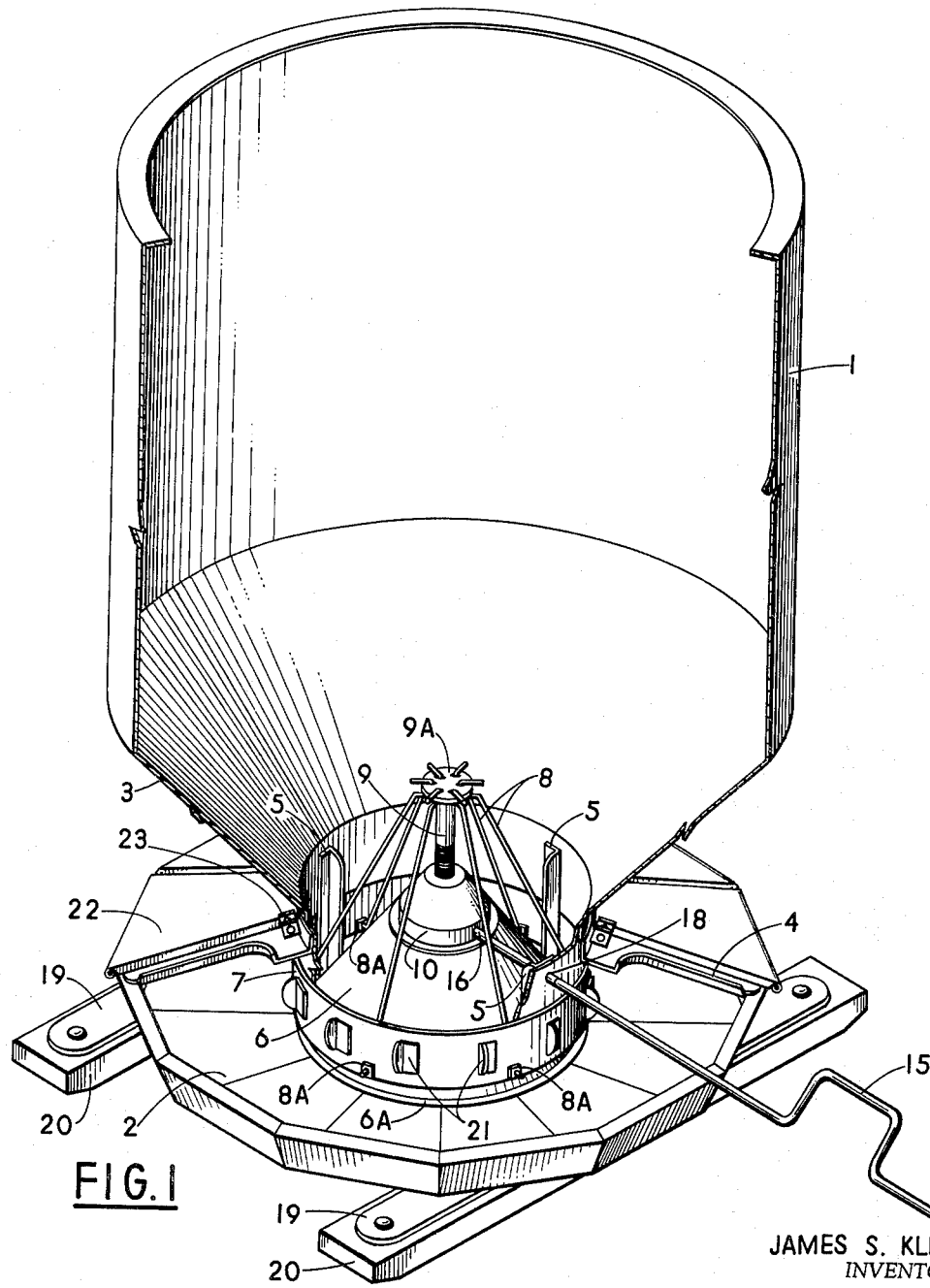
Figure 2:
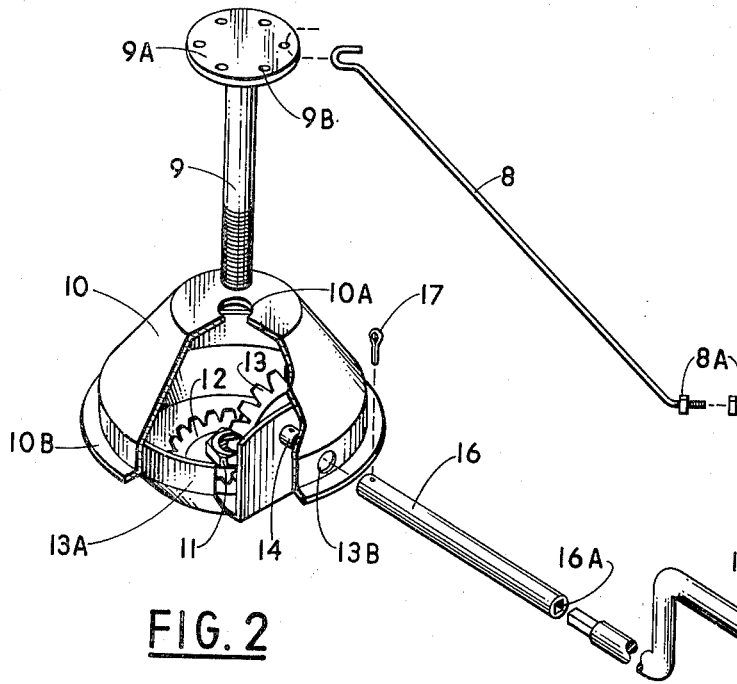
Figure 3:
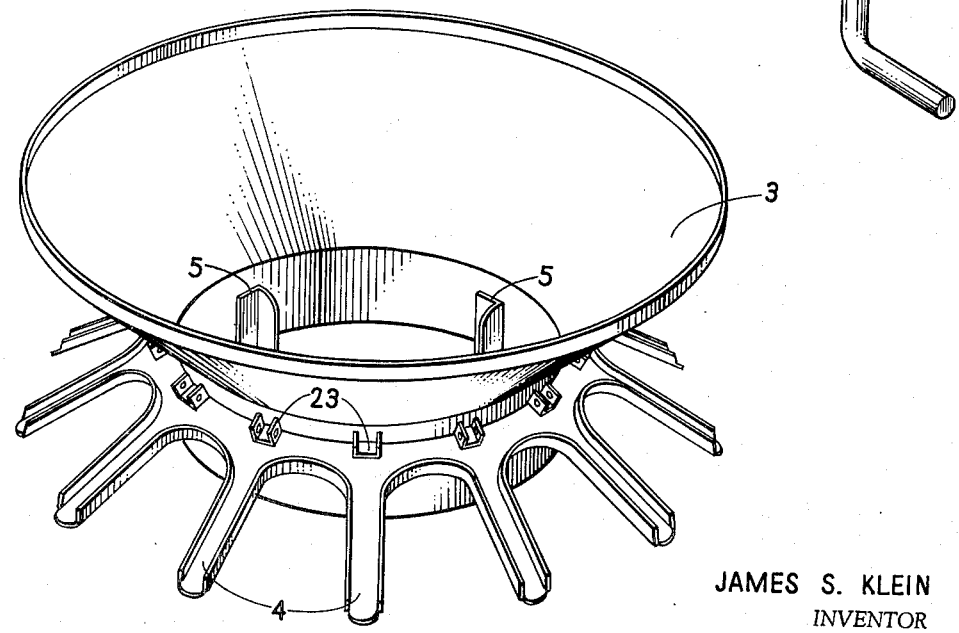

In the drawings, FIG. 1 is a partial isometric view of an animal feeder with the screw feed adjustment attached thereto, FIG. 2 is an expanded isometric view of the screw feed adjustment and FIG. 3 is an isometric view of the funnel of the hopper with the door channels attached thereto.

As shown in the drawings the animal feeder is comprised of a hopper 1 which is attached to a trough 2. The funnel 3 of the hopper 1 has rigidly attached thereto door channels 4 and legs 5. The door channels 4 are attached to the trough 2 making a rigid assembly. A truncated cone 6 is attached at its base 6A to the trough 2. The lower ends of rods 8 are attached to a feed control band 7 by being inserted through holes in the feed control band 7 and secured by nuts 8A screwed thereon and then riveted. The upper ends of rods 8 are attached to a screw 9 by being inserted through holes 9B in a plate 9A which is rigidly attached to the top of the screw 9. The screw 9 is inserted through a hole 10A in the top of housing 10 and screwed into a nut 11 which is an integral part of the center of a gear 12. The base 10B of the housing 10 is rigidly attached to the top of the cone 6. Gear 13 meshes with gear 12 and gears 12 and 13 are held in rigid rotatable relation to each other by means of gear box 13A. The gear box 13A and the base 10B of the housing 10 are rigidly fastened together. A short shaft 14 which is an integral part of gear 13 extends through gear box 13A. A connector 16 is fastened to the shaft 14 through hole 13B in the housing 10 by means of a cotter key 17. The connector 16 is rotatable through a hole 18 in the funnel 3. A crank 15 may be inserted in socket 16A at the end of the connector 16 and by turning the crank 15 the connector 16 and the gears 12 and 13 will also be made to turn. This will thus raise or lower the feed control band 7 in relation to the funnel 3. The animal feeder has skid pulls 19 and wooden skids 20 attached to the trough 2 for mobility about the barnyard. Bumpers 21 are attached to the feed control band 7 and allow the animals to move the feed control band 7 back and forth rotatably while feeding. The doors 22 are fastened to hinge brackets 23 on the door channnels 4 and can thus be raised by the animals to feed.

The operation of the screw feed adjustment is that when the hopper 1 is loaded with feed the feed will flow into the funnel 3 and is forced by gravity and the cone 6 under the bottom of the feed control band 7 if the feed control band 7 is raised off the bottom of the trough 2. Since the cone 6 is fastened to the trough 2 the flow of feed is between the legs 5 of the funnel 3 and under the feed control band 7. Turning the crank 15 will then raise or lower the feed control band 7 to the desired height. The operator may thus open one of the feed doors 22, turn the crank 15 and observe where the feed control band 7 is set. After the crank 15 is turned to the desired setting it can be removed from the socket 16A and hung in a holder (not shown) on the hopper 1. The hopper 1 has a lid (not shown) to protect the feed from the weather.

The bumpers 21 will move the feed control band 7 back and forth as the animals feed through the raised doors 22. This causes the feed to work underneath the feed control band 7 and to not pyramid in the hopper 1. The limits of the back and forth rotatable movement of the feed control band 7 are controlled by the relative positions of the rods 8, the connector 16 and the legs 5.

Thus the gear mechanism is completely isolated from the feed and will not be fouled by any flow of feed. The several rods 8 allow the feed control band 7 to raise uniformly around the trough 2 and there is no possibility of the adjustment being changed after once having been set.

I claim:
1. An animal feeder comprised of
a hopper,
a funnel at the lower end of the hopper,
a trough,
a plurality of door channels,
the door channels attached between the funnel and the trough,
a plurality of legs attached to the funnel,
the funnel spaced from the trough by the legs,
a screw feed adjustment having a housing,
a gear box enclosed in the housing,
a plurality of intermeshed gears held in fixed rotatable relation in the gear box,
a crank attachable to one of the gears from outside the housing,
a screw,
one of the gears threaded at its center so as to receive the screw,
the housing provided with an opening through which the screw protrudes,
a plurality of rods attached to the screw outside the housing,
a feed control band attached to the rods outside the housing,
a truncated cone,
the base of the housing attached to the top of the truncated cone,
the base of the cone attached to the trough, the feed control band being in slidable contact with the funnel.

2. An animal feeder comprised of
a hopper,
a funnel at the lower end of the hopper,
a trough,
a plurality of door channels,
the door channels attached between the funnel and the trough,
a plurality of legs attached to the funnel,
the funnel spaced from the trough by the legs,
a screw feed adjustment having a housing,
a gear box enclosed in the housing,
a plurality of intermeshed gears held in fixed rotatable relation in the gear box,
a crank attachable to one of the gears from outside the housing,
a screw,
one of the gears threaded at its center so as to receive the screw,
the housing provided with an opening through which the screw protrudes,
a plurality of rods attached to the screw outside the housing,
a feed control band attached to the rods outside the housing,
a truncated cone,
the base of the housing attached to the top of the truncated cone,
the base of the truncated cone attached to the trough,
the feed control band being in vertical and rotatable slidable contact with the funnel.

3. An animal feeder comprised of
a hopper,
a funnel at the lower end of the hopper,
a trough,
a plurality of door channels,
the door channels attached between the funnel and the trough,
a plurality of legs attached to the funnel,
the funnel spaced from the trough by the legs,
a screw feed adjustment having a housing,
a gear box enclosed in the housing,
a horizontal gear and a vertical gear,
the gears being intermeshed and rotatably fixed to the inside of the gear box,
a crank attachable to the vertical gear,
a nut forming an integral part of the center of the horizontal gear,
a screw engaged by the nut so as to raise and lower the screw when the crank is turned,
the housing provided with an opening through which the screw protrudes,
a disc attached to the top of the screw,
a plurality of rods attached around the circumference of the disc outside the housing,
a feed control band attached to the opposite ends of the rods,
a truncated cone,
the base of the housing attached to the top of the truncated cone,
the base of the cone attached to the trough,
the feed control band being in vertical slidable contact with the funnel to adjust the space between the funnel and the trough,
the feed control band having bumpers located thereon,
the feed control band being in rotatable slidable contact with the funnel so that horizontal pressure on the bumpers will rotate the feed control band within the limits of the distance between the rods and the legs.

References Cited by the Examiner

UNITED STATES PATENTS

| | | | |
|---|---|---|---|
| 555,909 | 3/96 | Smith | 119—53.5 |
| 1,274,548 | 8/18 | Holnagel et al. | |
| 2,122,150 | 6/38 | Lippold | 141—152 |
| 3,102,511 | 9/63 | Atcheson | 119—53 |
| 3,139,861 | 7/64 | Oliver et al. | 119—53 |

SAMUEL KOREN, *Primary Examiner.*

HUGH R. CHAMBLEE, *Examiner.*